United States Patent
Takagi

(10) Patent No.: US 9,013,718 B2
(45) Date of Patent: Apr. 21, 2015

(54) PRINT CONTROL APPARATUS, CONTROL METHOD THEREOF, AND DEVICE DRIVER FOR CONVERTING COMMANDS FROM ONE FORMAT TO ANOTHER

(75) Inventor: Yoshihiro Takagi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/717,805

(22) Filed: Mar. 4, 2010

(65) Prior Publication Data

US 2010/0157348 A1 Jun. 24, 2010

Related U.S. Application Data

(63) Continuation of application No. 11/359,718, filed on Feb. 22, 2006, now Pat. No. 7,706,001.

(30) Foreign Application Priority Data

Mar. 1, 2005 (JP) .................................. 2005-056215

(51) Int. Cl.
*G06F 3/12* (2006.01)

(52) U.S. Cl.
CPC ............ *G06F 3/1206* (2013.01); *G06F 3/1228* (2013.01); *G06F 3/1245* (2013.01); *G06F 3/1247* (2013.01); *G06F 3/1276* (2013.01)

(58) Field of Classification Search
USPC ............... 358/1.13, 1.14, 1.15, 1.17, 1.3, 500; 345/418, 562, 589, 592, 629, 631, 634; 382/232, 248; 400/61, 62, 76; 703/2; 709/202, 249, 231; 715/209, 249, 792, 715/835, 856, 859; 717/108
See application file for complete search history.

(56) References Cited

U.S. PATENT DOCUMENTS

| | | | |
|---|---|---|---|
| 5,977,977 A * | 11/1999 | Kajiya et al. .................. | 345/418 |
| 7,061,635 B1 * | 6/2006 | Wanda et al. ................ | 358/1.15 |
| 7,215,342 B2 | 5/2007 | Zhu | |
| 2002/0163544 A1 * | 11/2002 | Baker et al. ................... | 345/835 |
| 2004/0189656 A1 | 9/2004 | Moore | |
| 2004/0237053 A1 * | 11/2004 | Impas et al. .................. | 715/856 |
| 2004/0263892 A1 | 12/2004 | Uchida | |
| 2005/0243355 A1 * | 11/2005 | Foehr et al. .................. | 358/1.13 |
| 2005/0246145 A1 * | 11/2005 | Zhu ................................. | 703/2 |
| 2005/0285869 A1 * | 12/2005 | Sirois et al. .................. | 345/562 |
| 2006/0146353 A1 * | 7/2006 | Yue et al. ..................... | 358/1.13 |

FOREIGN PATENT DOCUMENTS

JP 2001-067347 A 3/2001

OTHER PUBLICATIONS

Excerpts from Feng Yuan, Windows Graphics Programming Win32 GDI and DirectDraw, Prentice Hall 2000, ISBN-13: 978-0-13-086985-2.*

(Continued)

*Primary Examiner* — David S Cammack
(74) *Attorney, Agent, or Firm* — Canon U.S.A., Inc. IP Division

(57) ABSTRACT

In order to allow any device to use a graphics device interface (GDI) driver without having to modify it once the GDI driver has been developed, the GDI driver is configured to create a spool format in a next-generation print path (NGPP) graphics engine specification and to convert drawing data in the spool format in the NGPP graphics engine specification into a page description language (PDL) by using an NGPP driver.

42 Claims, 10 Drawing Sheets

(56) References Cited

OTHER PUBLICATIONS

"Bitmap Basics—A GDI Tutorial", version of Feb. 23, 2001, author Chris Becke, downloaded form the Internet Archive at URL: <http://web.archive.org/web/20010223221047/http://www.mvps.org/user32/gditutorial.html>.*

Daniel Emerson "Advances in Windows Printing", Win HEC, May 7, 2004 (searched on Feb. 8, 2005, <http://www.microsoft.com/whdc/device/print/default.mxps>.

* cited by examiner

FIG. 7

| | DRAWING SOURCE | DRAWING METHOD | DRAWING DESTINATION | | DRAWING RESULT |
|---|---|---|---|---|---|
| STEP 1 | TREE | IMAGE DRAWING WITH SRCAND ROP (SOURCE AND DESTINATION) | | → | TREE |
| STEP 2 | TREE | IMAGE DRAWING WITH SRCPAINT ROP (SOURCE OR DESTINATION) | TREE | → | TREE |

PRINT CONTROL APPARATUS, CONTROL METHOD THEREOF, AND DEVICE DRIVER FOR CONVERTING COMMANDS FROM ONE FORMAT TO ANOTHER

CROSS REFERENCE OF RELATED APPLICATIONS

This application is a continuation of U.S. patent application Ser. No. 11/359,718 filed Feb. 22, 2006 which claims the benefit of Japanese Application No. 2005-056215 filed Mar. 1, 2005, both of which are hereby incorporated by reference herein in their entireties.

BACKGROUND OF THE INVENTION

1. Field of the Invention

The present invention relates to a print control apparatus that performs printing with two or more different graphics engines, a control method thereof, and a device driver.

2. Description of the Related Art

A technique for efficiently developing a printer driver that supports a plurality of operating systems by converting drawing commands in a first operating system (OS) and those in a second operating system into OS-independent common spool data and then transferring the OS-independent common spool data to a common renderer for the operating systems to create print commands, is described in Japanese Patent Laid-Open No. 11-110151.

Microsoft corporation announced the outlines of a next-generation printing system (NextGen Print Path, which is hereinafter referred to as NGPP) at WinHEC, the Windows Hardware Engineering Conference, in 2004 in Seattle, U.S.A.

The NGPP is a Microsoft's next-generation printing system that natively supports Avalon, which is a new graphics engine that will replace the graphics device interface (GDI). In the NGPP, as to the spool format of print jobs, the GDI-based enhanced metafile (hereinafter, referred to as EMF) is replaced with a new file format (NextGen Spool File, which is hereinafter referred to as NGSF).

FIG. 3 is a schematic diagram for the explanation of print paths, including the NGPP.

In FIG. 3, the NGPP is a new print path, and the GDI print path is a previous print path. In a case where no NGPP driver is present, a NextGen conversion print path is used. This relationship shows the following:

(1) An Avalon application 303 uses an NGPP driver 304, as indicated from the upper right to the lower right portion of the Figure.

(2) A Win32 application 301 uses a GDI driver 302, as indicated from the upper left to the lower left portion of the Figure.

(3) If the NGPP driver 304 is not present, the Avalon application 303 uses the GDI driver 302 through the NextGen conversion print path, as indicated from the upper right to the lower left.

In other words, the GDI driver 302 is necessary to cope with both applications, whereas the NGPP driver 304 is optional.

In the future, corporations that develop a printer driver will adopt a strategy of investing in the development of the NGPP without investing in that of the GDI print path. However, the printing system described above requires the development of the GDI driver, and therefore, the investment for development of the GDI print path cannot be avoided. It is thus easily conceivable that this investment will put an enormous load on each corporation's development costs.

The present invention is aimed to overcome, at least in part, such a drawback.

SUMMARY OF THE INVENTION

The present invention provides a device driver that supports a next-generation application by creating a general-purpose spool file that supports a next-generation print path by using a general-purpose GDI and then transferring the general-purpose spool file to the next-generation application.

According to a first aspect of the present invention, a print control apparatus capable of executing a first graphics engine and a second graphics engine on an operating system, the first and second graphics engines being different from each other, the print control apparatus includes a first device driver in the first graphics engine and a second device driver in the second graphics engine. The first device driver is configured to create drawing data in a spool format in the second graphics engine. The second device driver is configured to output print data to a printing device on the basis of the drawing data in the spool format in the second graphics engine.

Further features of the present invention will become apparent from the following description of exemplary embodiments with reference to the attached drawings.

BRIEF DESCRIPTION OF THE DRAWINGS

FIG. 7 is an illustration of an example of a process of replacing a device driver interface (DDI) with alpha blending and shows DDI processing.

DESCRIPTION OF THE EMBODIMENTS

Exemplary embodiments are described below with reference to the attached drawings. The present invention is not limited to the exemplary embodiments described below. Not all combinations of the means and/or characteristics in the exemplary embodiments are necessary for solving the problems. A case in which an image processing apparatus according to the exemplary embodiments is a computer (personal computer (PC)) is described below.

Figure 1:
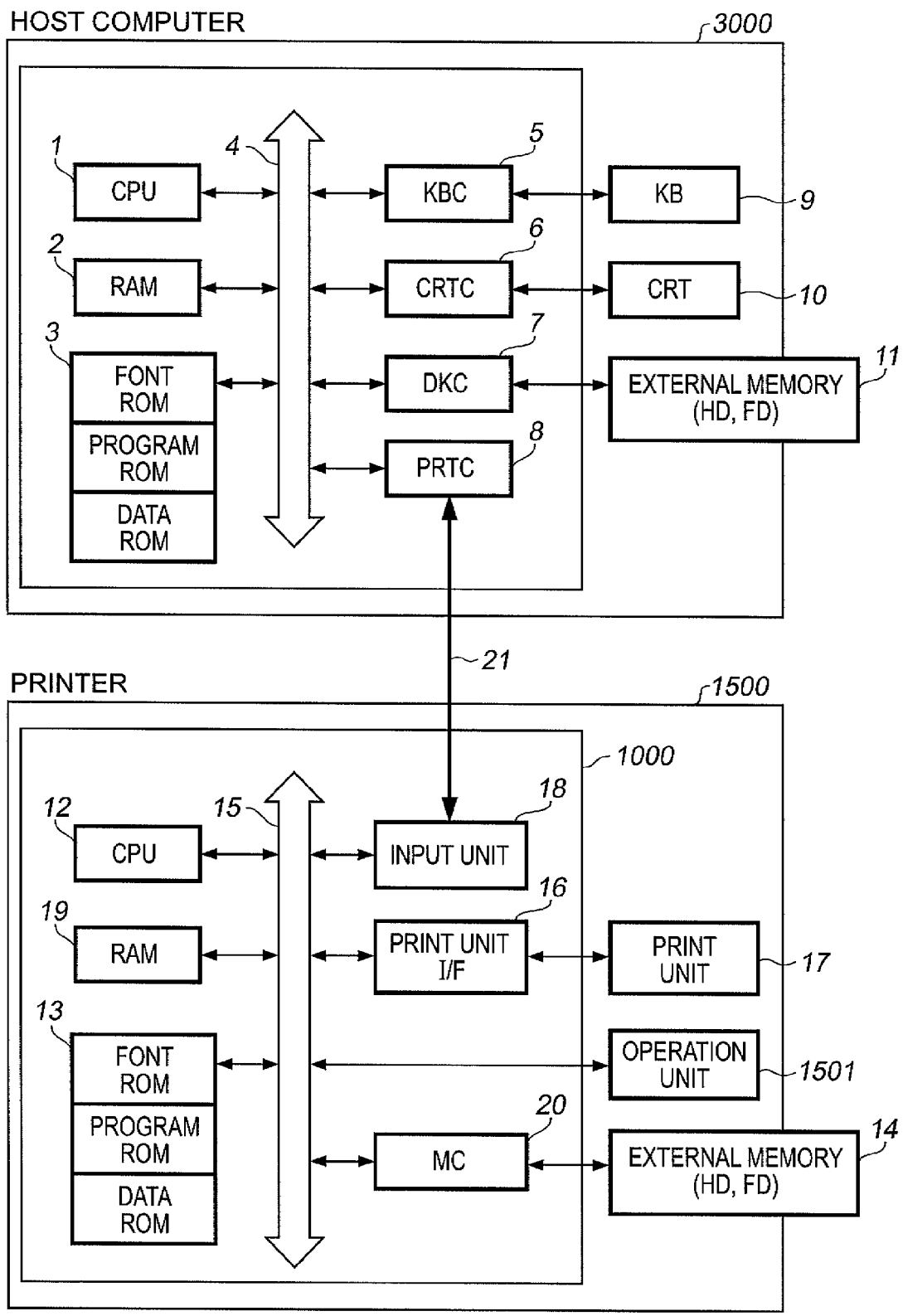
FIG. 1 is a block diagram of a printer control system including a computer (personal computer (PC)) according to an exemplary embodiment of the present invention.

FIG. 1 is a block diagram of a printer control system, including a computer (PC), according to an exemplary embodiment. The present invention is applicable to a single device, a system including a plurality of devices, and a system that performs processing while being connected a plurality of apparatuses over a local area network (LAN), a wide area network (WAN), or other networks, unless otherwise specified, as long as the functions in the exemplary embodiments are performed.

A host computer 3000 includes a central processing unit (CPU) 1 configured to perform processing of a document that contains a picture, an image, a character, a table (including a spreadsheet) in accordance with a document-processing program stored in a program read-only memory (ROM) of a ROM 3 or an external memory 11. The CPU 1 controls devices connected to a system bus 4. The program ROM in the ROM 3 or the external memory 11 stores an operating system (OS) serving as a control program of the CPU 1 and the like. The external memory 11 and/or a font ROM in the ROM 3 stores font data used in the document processing and other data. The external memory 11 and/or a data ROM in the ROM 3 stores various kinds of data used in the document processing and other processing. A random-access memory (RAM) 2 functions as a main memory for the CPU 1 and a work area. A keyboard controller (KBC) 5 controls entry from a keyboard (KB) 9 and a pointing device (not illustrated). A cathode-ray tube controller (CRTC) 6 controls display on a CRT display (CRT) 10. A disk controller (DKC) 7 controls access to the external memory 11 (e.g., a hard disk (HD) and a flexible disk (FD)) which stores a boot program, various application programs, font data, a user file, an editing file, a program for creating a printer control command (hereinafter, referred to as printer driver), and the like. A printer controller (PRTC) 8 is connected to a printer 1500 with a predetermined interactive interface 21 therebetween and is configured to execute processing for controlling communications with the printer 1500. The CPU 1 is configured to execute processing for converting (rasterizing) outline fonts for transmission to, for example, a display RAM on the RAM 2, thus allowing WYSIWYG (what you see is what you get) capability on the CRT 10. The CPU 1 is configured to open various registered windows on the basis of a command that is pointed to with a mouse cursor (not illustrated) on the CRT 10 and to execute various kinds of data processing. This allows a user to open a window regarding print settings, specify a desired printer setting, and set a printing method to a printer driver, including a print-mode selection, when the user is to perform printing.

An exemplary structure of the printer 1500 is described below. A printer controller 1000 is configured to create bitmap data on the basis of a PDL received from the host computer 3000, and to supply a video signal based on the created bitmap data to a print unit (printer engine) 17 via a print unit interface (I/F) 16. A printer CPU 12 is configured to output an image signal serving as output information to the print unit 17 connected to a system bus 15 in accordance with a control program stored in a program ROM in a ROM 13 or in an external memory 14. The program ROM in the ROM 13 stores a control program for the CPU 12 and other programs. A font ROM in the ROM 13 stores font data used in the creation of the output information and other data. A data ROM in the ROM 13 stores information used in the host computer 3000 and other information in the case where the external memory 14 (e.g., HD) is not present.

The CPU 12 can communicate with the host computer 3000 via an input unit 18, so that information in the printer 1500 can be transferred to the host computer 3000. A RAM 19 functions as a main memory for the CPU 12 and a work area.

The capacity of the RAM 19 can be increased by adding an optional RAM connected to an expansion port (not illustrated). The RAM 19 is used as an area where output information is expanded, an area for storing environmental data, and a nonvolatile random access memory (NVRAM). Access to and from the external memory 14 (e.g., HD and IC card) is controlled by a memory controller (MC) 20. The external memory 14 is optional, and is configured to store font data, form data, and an emulation program. The input unit 18 includes a switch and a light-emitting diode (LED) indicator for operation on an operation panel. The external memory 14 is not limited to a single external memory unit, in other words, the external memory 14 is composed of at least one external memory unit. The external memory 14 may include connected external memory units. Examples of the external memory units include an optional font card that stores font data other than built-in font data and an external memory unit that stores a program used for interpreting a printer control language under a different language system. Moreover, the external memory 14 may include an NVRAM (not illustrated) for storing information regarding a printer mode specified by operation of an operation unit or panel 1501.

Figure 2:
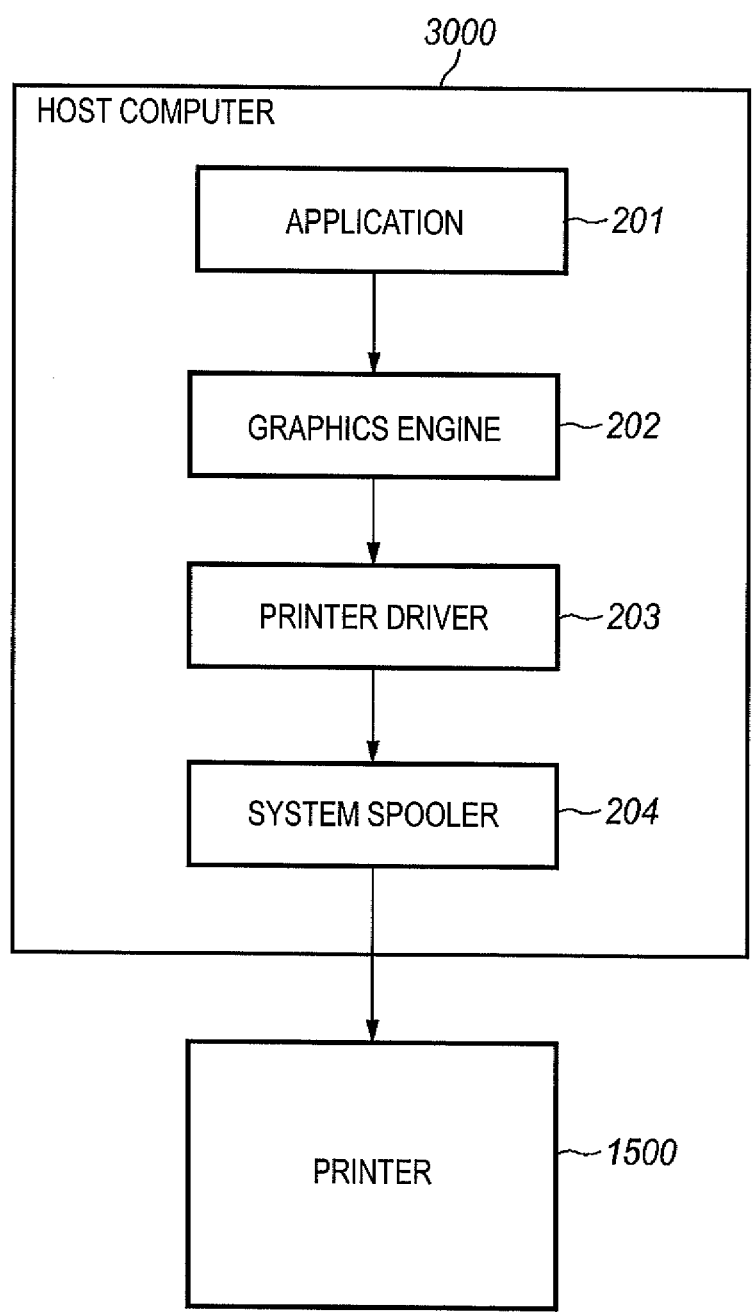
FIG. 2 illustrates a typical method for creating print data in a host computer according to an exemplary embodiment.
Figure 3:
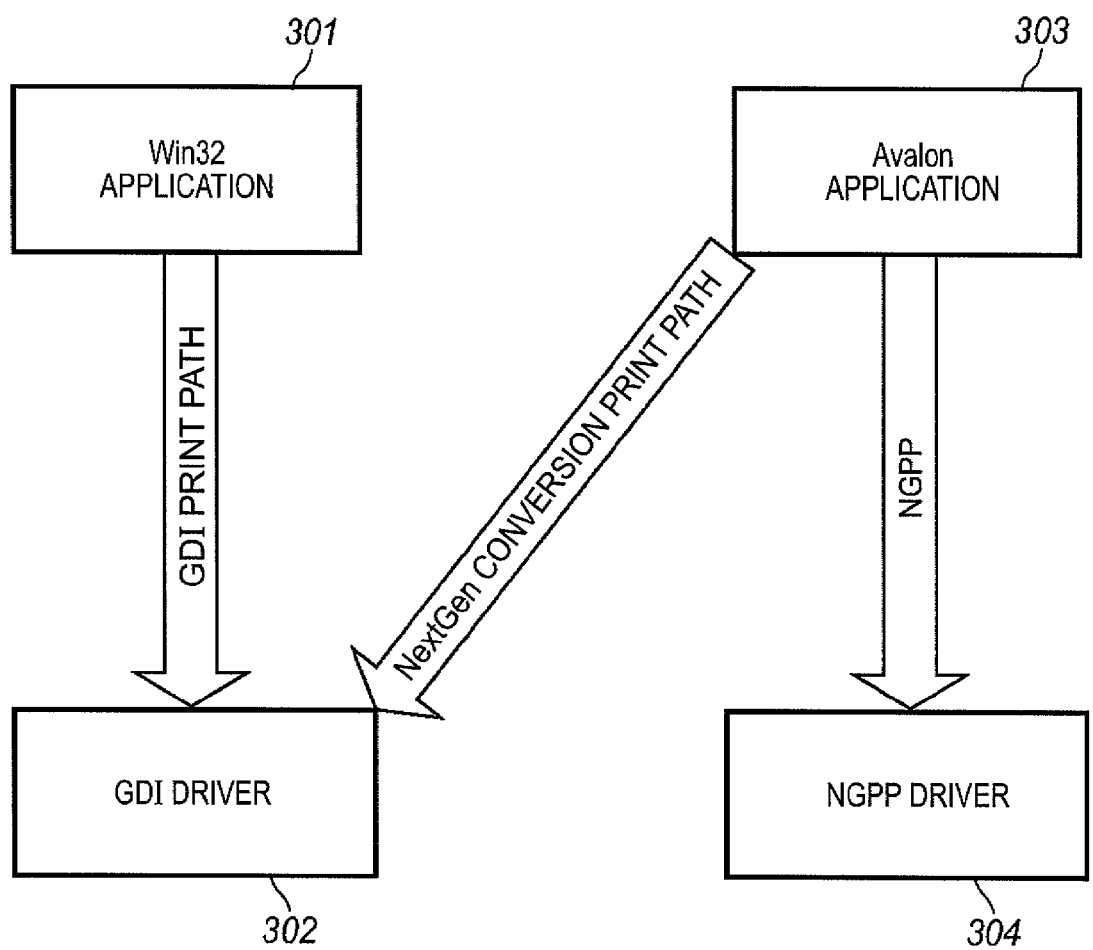
FIG. 3 is a schematic diagram for explanation of print paths, including a next-generation print path (NGPP).

FIG. 2 illustrates a typical method for creating print data in the host computer 3000 according to an exemplary embodiment.

An application 201, a graphics engine 202, a printer driver 203, and a system spooler 204 are present as files stored in the external memory 11 (e.g., HD) and are program modules that are loaded into the RAM 2 and executed by the OS or another module that aims to use the program modules. The application 201 and printer driver 203 can be added to the HD in the external memory 11 via an FD in the external memory 11 or a CD-ROM (not illustrated) or via a network (not illustrated). The application 201 stored in the external memory 11 is executed after being loaded into the RAM 2. When the application 201 is to perform print processing with respect to the printer 1500, output (drawing) is performed using the graphics engine 202 that has become executable after having been loaded into the RAM 2 in a similar manner. The graphics engine 202 is configured to load the printer driver 203 (which is prepared for each printer from the external memory 11 to the RAM 2) and convert the output from the application 201 into a control command for the printer 1500 by using the printer driver 203. The printer control command created by such conversion is transferred to the system spooler 204 that has been loaded into the RAM 2 by the OS and then output to the printer 1500 via the interface 21. The printer 1500 then performs printing.

Figure 4:
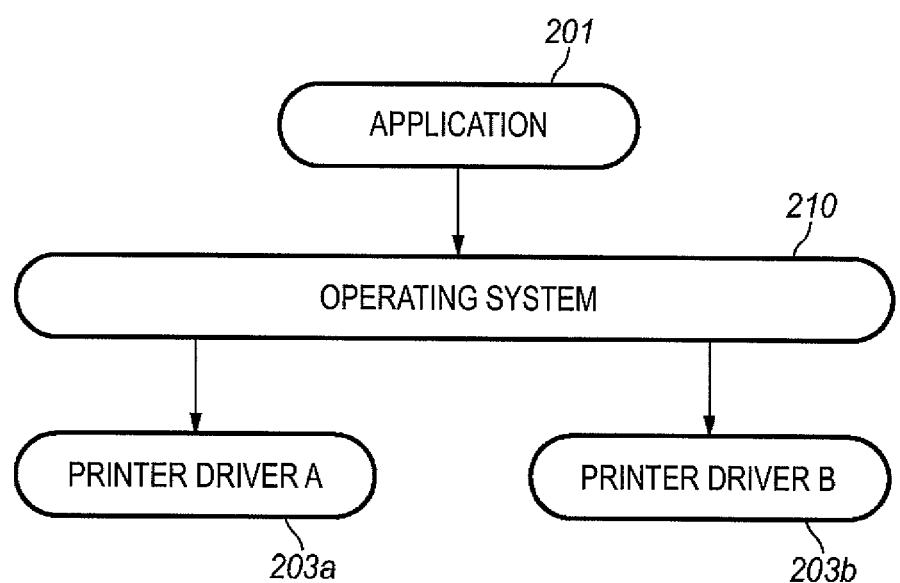
FIG. 4 is a schematic diagram of an exemplary relationship between an application in a host computer and printer drivers for respective printers according to an exemplary embodiment.

FIG. 4 is a schematic diagram for explanation of an exemplary relationship between the application 201 in the host computer 3000 and printer drivers 203a and 203b for respective printers according to an exemplary embodiment.

The application 201 calls various functions (application program interfaces (APIs)) provided by an operating system 210 to perform processing. The operating system 210 calls a function (device driver interface (DDI)) provided by a printer driver corresponding to a selected printer to perform processing regarding printing. In this way, print processing in a selected printer corresponding to the printer driver 203a or 203b is executable from the application 201.

Figure 5:
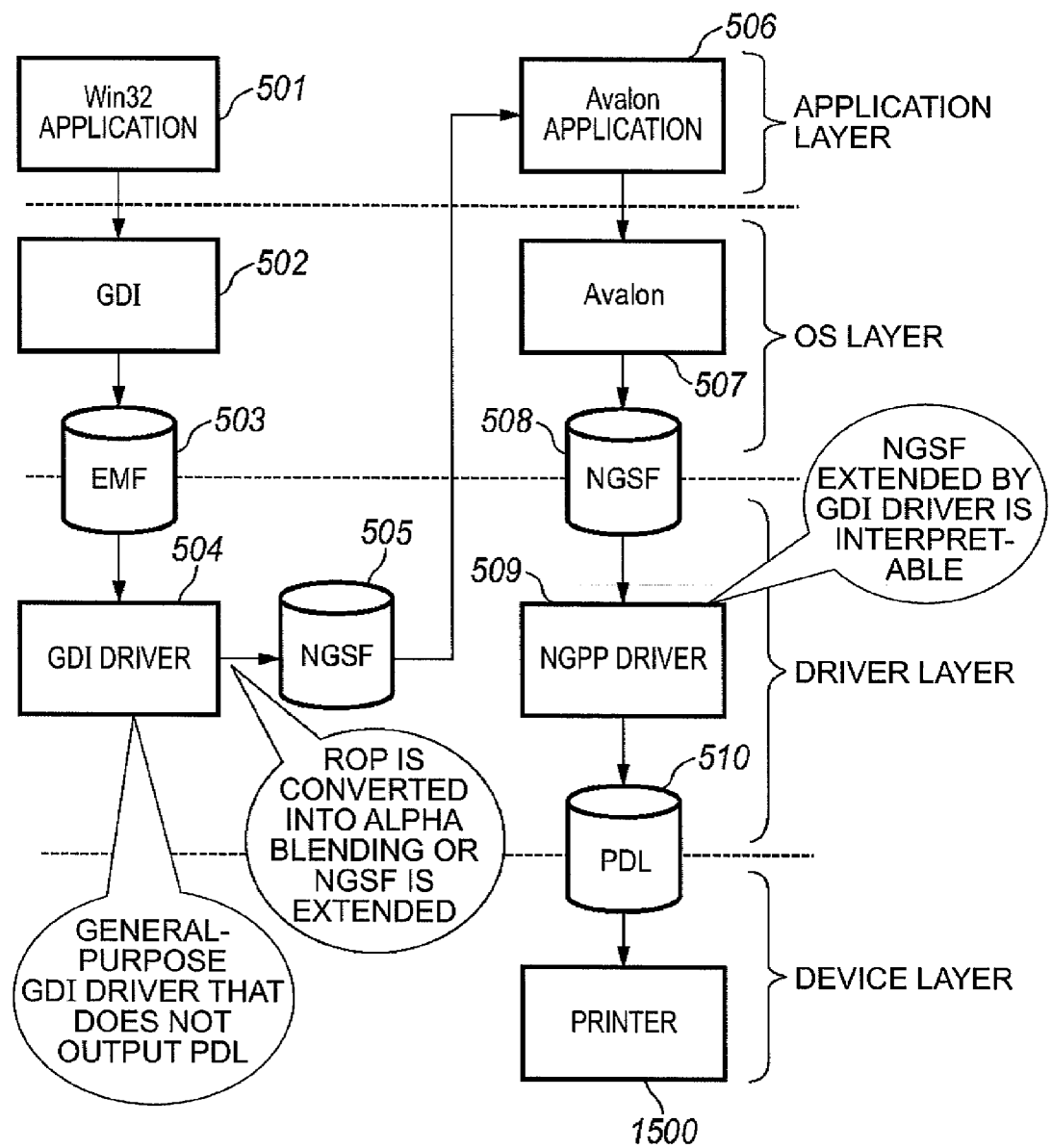
FIG. 5 illustrates a flow of print data from an application layer to a device layer via an operating system (OS) layer and a driver layer according to an exemplary embodiment.

FIG. 5 illustrates a flow of print data from an application layer to a device layer via an OS layer and a driver layer according to an exemplary embodiment.

When a Win32 application 501 calls an API in a GDI 502 to execute printing, an EMF 503 is then created as an intermediate spool file. In response to a call of a driver function (DDI) from the EMF 503, a GDI driver 504 is called. The GDI driver 504 does not output a PDL. The GDI driver 504 creates an NGSF 505 serving as a spool file in the NGPP specification instead. An own Avalon application 506 is launched from the GDI driver 504, and the created NGSF 505 is transferred to the Avalon application 506. This creation of the NGSF 505 is described later with reference to the flowchart of FIG. 6.

The Avalon application 506 launched from the GDI driver 504 calls an API in an Avalon 507 in the OS layer to execute printing of the NGSF. Although the details are not described here, the layout of drawing data in the NGSF 505 can be edited in this stage. Here, on the basis of the API in the Avalon 507, an NGSF 508 serving as an intermediate spool file is created. The NGSF 505 is not necessarily the same as the NGSF 508. An NGPP driver 509 reads the created NGSF 508, converts the NGSF 508 into a PDL 510, and outputs it to the printer 1500. This conversion to the PDL is described later with reference to the flowchart of FIG. 10. At this stage, instead of outputting the PDL 510, the Avalon application 506 may be launched again, as in the GDI driver 504, and the edited NGSF 508 may be reprinted.

As is evident from the foregoing, the GDI driver 504 is independent of the printer 1500 and the PDL 510. Increased versatility in the GDI driver 504 is one of the major characteristics of the exemplary embodiment.

Figure 6:
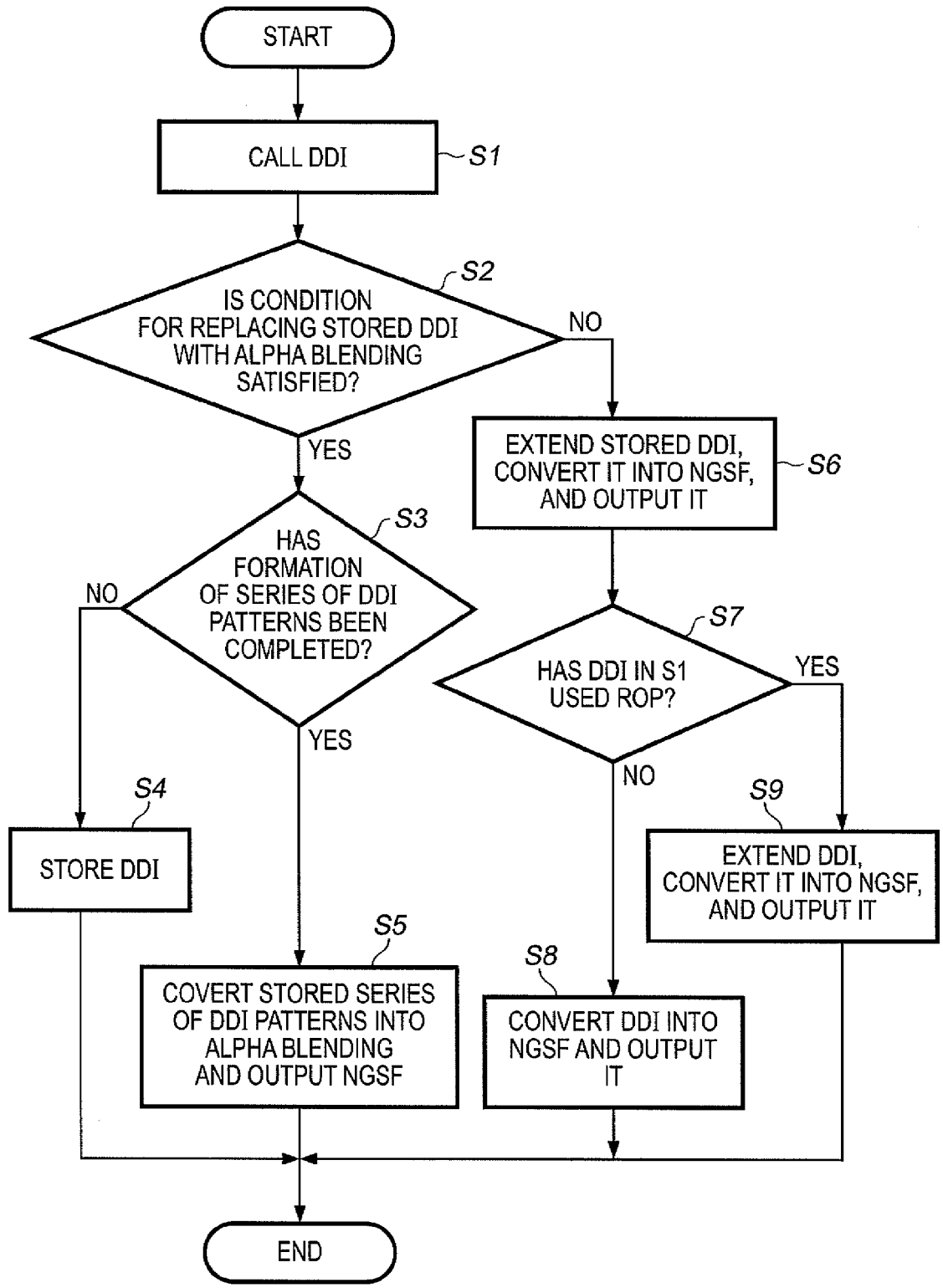
FIG. 6 is a flowchart of a process of creating a NextGen Spool File (NGSF) by a graphics device interface (GDI) driver according to an exemplary embodiment.

FIG. 6 is a flowchart of a process in which the GDI driver 504 creates the NGSF 505 according to the exemplary embodiment. In this flowchart, since conversion of GDI-specific drawing data (e.g., raster operation, which is hereinafter referred to as ROP) to drawing data in Avalon is impossible, a spool file in which the GDI-specific drawing data is replaced with an alpha channel is created.

In usual printing, a document is composed of a plurality of pages, and each page is composed of a plurality of drawing device driver interfaces (DDIs). The flowchart of FIG. 6 shows processing occurring when a drawing DDI is called once. Therefore, the processing of the flowchart is repeated multiple times in a single page, and such repeated processing is performed for each page, i.e., is repeated multiple times. As a result of this, the printed matter of the document is created. On the basis of the foregoing, the details of the flowchart are described below.

In step S1, a DDI is called. The DDI is a function to which various parameters required for drawing are passed as arguments. In step S2, it is determined whether a combination of an input DDI parameter in step S1 and a DDI parameter stored in step S4, which is described below, can be replaced with alpha blending. If, in step S2, it is determined that the combination can be replaced with alpha blending, the processing then proceeds to step S3; if not, the processing proceeds to step S6. Conditions for replacement with alpha blending are described later with reference to FIGS. 8 and 9.

In step S3, it is determined whether the formation of a series of DDI patterns acquired in step S2 has been completed. If, in step S3, it is determined that the formation is uncompleted, the processing then proceeds to step S4 which stores the DDI acquired in step S1. If, in step S3, it is determined that the formation has been completed, the processing then proceeds to step S5 which replaces a series of DDI patterns acquired in step S2 with alpha blending and outputs an NGSF 505.

In step S6, a series of DDI patterns stored in step S4 is extended and converted to the NGSF 505, and the NGSF 505 is output. A process of this extension and conversion is described later. In step S7, it is determined whether the DDI acquired in step S1 has used an ROP. If, in step S7, it is determined that no ROP has been used in the DDI, the processing then proceeds to step S8; if it is determined that the ROP has been used in the DDI, the processing then proceeds to step S9. In step S8, the DDI acquired in step S1 is converted into the NGSF 505, and the NGSF 505 is output. In step S9, the DDI acquired in step S1 is extended and converted to the NGSF 505, and the NGSF 505 is output.

Figure 8:
FIG. 8 is an illustration of an example of a process of replacing a device driver interface (DDI) with alpha blending and shows alpha blending.

FIGS. 7 and 8 are illustrations of an example of processing of replacing a DDI with alpha blending. FIGS. 7 and 8 show DDI and alpha blending, respectively.

FIG. 7 illustrates a typical example of drawing a bitmap by ROP while a background in the bitmap remains transparent. More specifically, a bitmap DDI function known as DrvBitBlt is performed in steps 1 and 2, i.e., twice in succession. In step 1, logical drawing is carried out so as to perform the logical AND operation between a binary black-and-white image (source) and a base (destination), which is expressed as "SRCAND" in the ROP.

In step 2, logical drawing is carried out so as to perform the logical OR operation between a bitmap with a black background (source) and the base created in step S1 (destination), which is expressed as "SRCPAINT" in the ROP.

In this way, a bitmap is drawn while a specific color in the bitmap remains transparent with respect to a base.

FIG. 8 illustrates a typical example of drawing a bitmap by alpha blending while a background in the bitmap remains transparent. Here, on the basis of a binary black-and-white image, specifications of the alpha blending are divided. In this example, black in the black-and-white image represents opaqueness, and white represents transparency.

As is evident from the foregoing, a drawing process using ROP through multiple steps, as shown in FIG. 7, and a drawing process using alpha blending through a single step, as shown in FIG. 8, reach the same drawing result.

Figure 9:
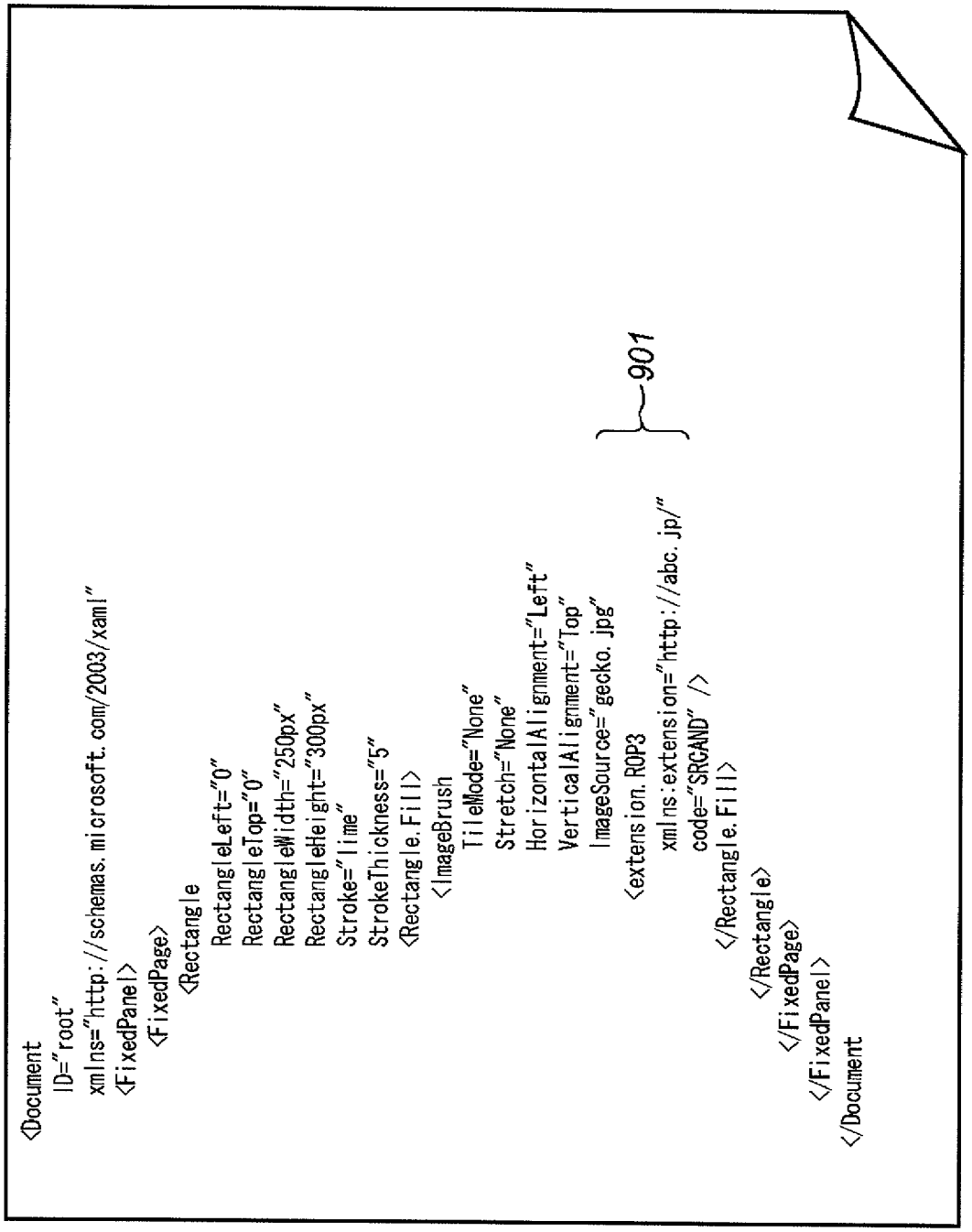
FIG. 9 illustrates an example of an extended NGSF as an exemplary embodiment of the present invention.

FIG. 9 illustrates an example of processing of creating an extended NGSF by extending and converting a DDI.

NGSF has no method for describing ROP. However, since a drawing unit in the NGSF can be described in the eXtensible Markup Language (XML), defining an own name space, as shown in an area 901, this enables a description in ROP which cannot be replaced with alpha blending to be extended and added to the NGSF. In the area 901, an ROP3 code "SRCAND" is described. Therefore, any ROP can be defined in the NGSF.

Figure 10:
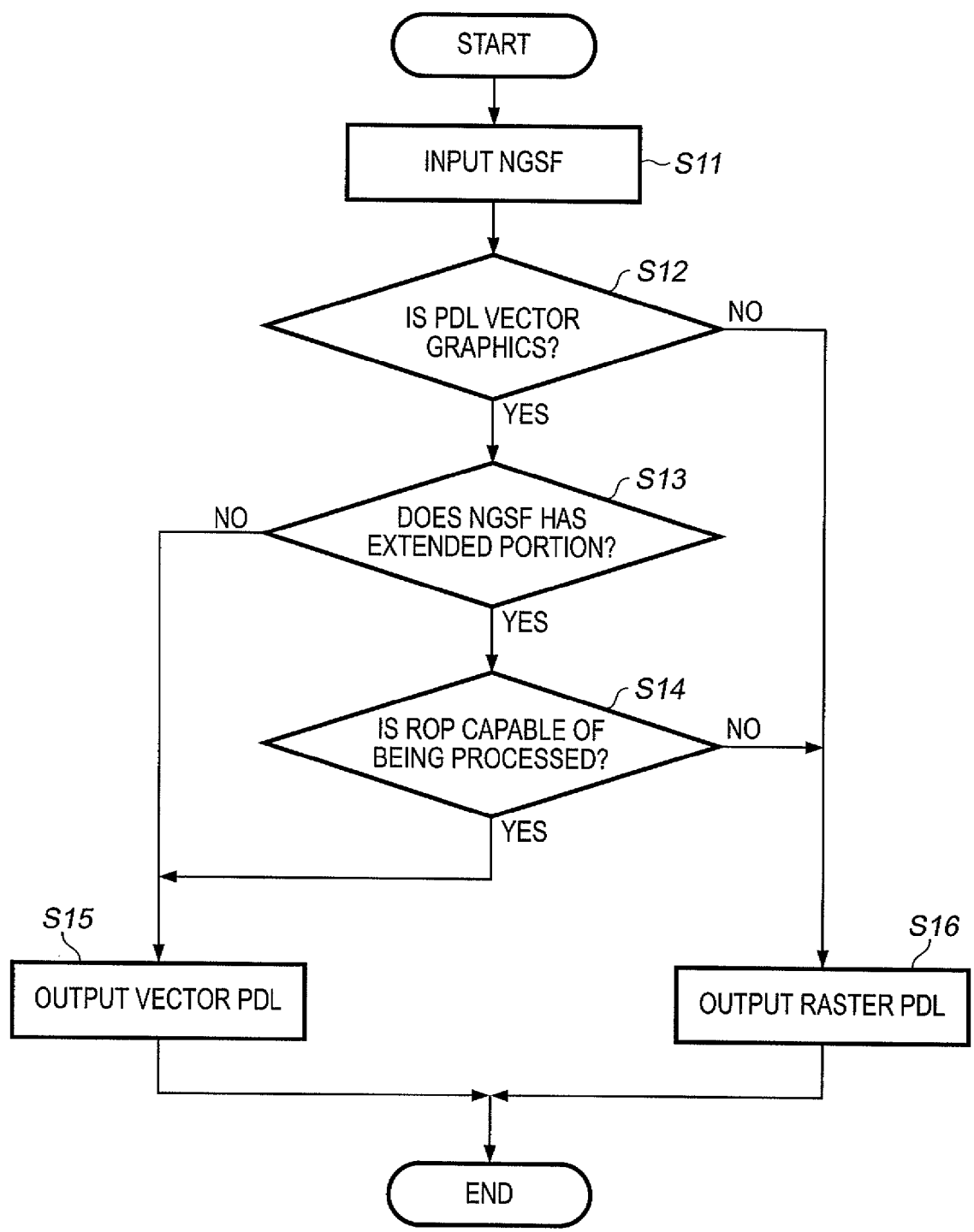
FIG. 10 is a flowchart of a process in which an NGPP driver creates a page description language (PDL).

FIG. 10 is a flowchart of a process in which the NGPP driver 509 creates the PDL 510.

In step S11, the NGSF 508 is input. In step S12, a drawing method is determined. If output data is to be processed as vector graphics, the processing proceeds to step S13; if other determination is made, i.e., if output data is to be processed as a raster image, the processing proceeds to step S16. In step S13, it is determined whether the NGSF 508 has been extended. Here, if the processing in step S6 or step S9 in FIG. 6 has been performed, the NGSF 508 has been extended. If, in step S13, it is determined that the NGSF 508 has been extended, the processing then proceeds to step S14; if not, the processing then proceeds to step S15. In step S14, it is determined whether the PDL 510 can process ROP. If, in step S14, it is determined that the PDL 510 can process ROP, the processing then proceeds to step S15; if not, the processing then proceeds to step S16. In step S15, the PDL 510 that contains vector graphics data is output. In step S16, the PDL 510 that contains raster image data is output.

As described above, according to the exemplary embodiments, once a GDI driver has been developed, the GDI driver will be able to be used without having to be modified in any device.

Additionally, development work can focus on NGPP, and therefore, development costs can be significantly reduced.

Moreover, drawings with GDI-specific ROP, which are not expressed in Avalon originally, can be properly printed. Therefore, the productivity of printer drivers can be substantially increased.

The present invention can be realized by supplying a software program that performs the functions of the exemplary embodiments directly or remotely to a system or an apparatus and reading and executing the supplied program by a computer of the system or the apparatus. In this case, the program may have any form as long as it has the functions of the program. Therefore, the present invention is applicable to program code itself which is installed in the computer to realize functional processing of the exemplary embodiments of the present invention. In this case, the program may have any form, such as object code, a program executable by an interpreter, script data to be supplied to an operating system (OS), or some combination thereof, as long as it has the functions of the program.

Examples of storage media for supplying a program include, but are not limited thereto, a flexible disk, a hard disk, an optical disk, a magneto-optical disk (MO), a compact disk read-only memory (CD-ROM), a CD recordable (CD-R), a CD-Rewritable (CD-RW), magnetic tape, a nonvolatile memory card, a ROM, a digital versatile disk-ROM (DVD-ROM), a DVD-R, and the like. Further, examples of methods for supplying a program include, but are not limited thereto, connecting to a website on the Internet using a browser of a client computer and downloading a computer program itself or a compressed file of the program with an automatic installer from the website to a storage medium (e.g., a hard disk), and the like. Moreover, program code constituting the program according to the exemplary embodiments of the present invention may be divided into a plurality of files and each file may be downloaded from different websites. In other words, a World Wide Web (WWW) server that allows a program file for realizing the functional processing of the present invention by a computer to be downloaded to a plurality of users is included in the scope of the present invention and the following claims.

Encrypting a program according to the exemplary embodiments of the present invention, storing the encrypted program in storage media, such as CD-ROMs, distributing them to users, allowing a user who satisfies a predetermined condition to download information regarding a decryption key from a website over the Internet and to execute the encrypted program using the information regarding the key, thereby enabling the user to install the program in a computer can realize the functions of the exemplary embodiments of the present invention.

Executing a read program by a computer can realize the functions of the exemplary embodiments described above. In addition, performing actual processing in part or in entirety by an operating system (OS) running on a computer in accordance with instructions of the program can realize the functions of the exemplary embodiments described above.

Further, after a program read from a storage medium is written on a memory included in a feature expansion board inserted into a computer or in a feature expansion unit connected to the computer, a CPU included in the feature expansion board or the feature expansion unit may perform actual processing in part or in entirety in accordance with instructions of the program, thereby realizing the functions of the exemplary embodiments described above.

According to the exemplary embodiments, once a GDI driver has been developed, the GDI driver will be able to be used without having to be modified in any device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

what is claimed is:

1. An information processing apparatus including a first printer driver and a second printer driver, the apparatus comprising:
a processor for executing the following processes in response to a single print instruction from a user;
inputting a first command for logically ANDing a base bitmap and a black-and-white bitmap and a second command for logically ORing a result of the logically ANDing and a bitmap including a black part, wherein the first printer driver is capable of executing a process based on the first and second commands;
generating, from the first and second commands, a third command for rendering on a base bitmap, a bitmap in which the black part included in the bitmap including the black part is transparent and a part other than the black part included in the bitmap including the black part is opaque, wherein the second printer driver is capable of executing a process based on the third command; and
providing the third command so that the third command is provided, in response to the single print instruction from the user, to the second printer driver and is not provided, in response to the single print instruction from the user, to the first printer driver, and the second printer driver executes, in response to the single print instruction from the user, the process based on the third command for causing a printer to print,
wherein the first printer driver does not execute the process based on the first and second commands for causing, in response to the single print instruction from the user, a printer to print.

2. The information processing apparatus according to claim 1, wherein the bitmap in which the black part included in the bitmap including the black part is transparent and the part other than the black part included in the bitmap including the black part is opaque is a bitmap including an alpha channel.

3. The information processing apparatus according to claim 2, wherein the alpha channel includes data indicating positions of the transparent part and the opaque part.

4. The information processing apparatus according to claim 1, wherein the black part and the part other than the black part correspond to a white part and a black part in the black-and-white bitmap respectively.

5. The information processing apparatus according to claim 1, wherein positions of the black part and the part other than the black part are the same as positions of a white part and a black part in the black-and-white bitmap respectively.

6. The information processing apparatus according to claim 1, wherein the transparent part and the opaque part correspond to a white part and a black part in the black-and-white bitmap respectively.

7. The information processing apparatus according to claim 1, wherein positions of the transparent part and the opaque part are the same as positions of a white part and a black part in the black-and-white bitmap respectively.

8. The information processing apparatus according to claim 1, wherein the black-and-white bitmap is a binary image.

9. The information processing apparatus according to claim 1, wherein the first printer driver is a printer driver for a GDI graphics engine and the second printer driver is a printer driver for a graphics engine different from the GDI graphics engine.

10. The information processing apparatus according to claim 9, wherein a spool format for the GDI graphics engine is a spool format used in a GDI print path, and a spool format for the graphics engine different from the GDI graphics engine is a spool format used in a print path different from the GDI print path.

11. The information processing apparatus according to claim 9, further comprising:
the GDI graphics engine, wherein the first command for the logically ANDing and the second command for the logically ORing are for the first graphics engine; and
the graphics engine different from the GDI graphics engine, wherein the third command is for the graphics engine different from the GDI graphics engine which is a next generation graphics engine of the GDI graphics engine.

12. The information processing apparatus according to claim 9, wherein both the GDI graphics engine and the graphics engine different from the GDI graphics engine operate on a single operating system.

13. The information processing apparatus according to claim 9, wherein the GDI graphics engine supports a command using a raster operation.

14. The information processing apparatus according to claim 13,
wherein the third command is described in a spool format for the graphics engine different from the GDI graphics engine and does not include a command using a raster operation, and
wherein the spool format is different from a spool format for the GDI graphics engine.

15. The information processing apparatus according to claim 14, wherein the logically ANDing is execution of a raster operation which is expressed as SRCAND.

16. The information processing apparatus according to claim 15, wherein the logically ORing is execution of a raster operation which is expressed as SRCPAINT.

17. The information processing apparatus according to claim 1, wherein the process based on the third command for causing a printer to print is executed for the printer printing an image based on the third command.

18. The information processing apparatus according to claim 1, wherein the process based on the third command executed, in response to the single print instruction from the user, by the second printer driver includes an output process of page description language data based on the third command to a printer.

19. The information processing apparatus according to claim 1, wherein the process based on the third command executed, in response to the single print instruction from the user, by the second printer driver includes a conversion process of the third command into the page description language data.

20. The information processing apparatus according to claim 1, wherein the process based on the first and second command includes an output process of page description language data based on the first and second command to a printer.

21. The information processing apparatus according to claim 20, wherein the process based on the first and second command includes a conversion process of the first and second command into the page description language data.

22. A method executed in an information processing apparatus including a first printer driver and a second printer driver, wherein the apparatus includes a processor, wherein the method is executed by the processor in response to a single print instruction from a user, the method comprising:
inputting a first command for logically ANDing a base bitmap and a black-and-white bitmap and a second command for logically ORing a result of the logically ANDing and a bitmap including a black part, wherein the first printer driver is capable of executing a process based on the first and second commands;
generating, from the generated first and second commands, a third command for rendering on a base bitmap, a bitmap in which the black part included in the bitmap including the black part is transparent and a part other than the black part included in the bitmap including the black part is opaque, wherein the second printer driver is capable of executing a process based on the third command; and
providing the third command, so that the third command is provided, in response to the single print instruction from the user, to the second printer driver and is not provided, in response to the single print instruction from the user, to the first printer driver, and the second printer driver executes, in response to the single print instruction from the user, the process based on the third command for causing a printer to print,
wherein the first printer driver does not execute the process based on the first and second commands for causing, in response to the single print instruction from the user, a printer to print.

23. The method according to claim 22, wherein the first printer driver is a printer driver for a GDI graphics engine and the second printer driver is a printer driver for a graphics engine different from the GDI graphics engine.

24. A non-transitory computer readable medium containing a program causing an information processing apparatus including a first printer driver and a second printer driver, wherein the apparatus includes a processor which executes a method, wherein the method is executed by the processor in response to a single print instruction from a user, the method comprising:
inputting a first command for logically ANDing a base bitmap and a black-and-white bitmap and a second command for logically ORing a result of the logically ANDing and a bitmap including a black part, wherein the first printer driver is capable of executing a process based on the first and second commands;
generating, from the generated first and second commands, a third command for rendering on a base bitmap, a bitmap in which the black part included in the bitmap including the black part is transparent and a part other than the black part included in the bitmap including the black part is opaque, wherein the second printer driver is capable of executing a process based on the third command; and
providing the third command so that the third command is provided, in response to the single print instruction from the user, to the second printer driver and is not provided, in response to the single print instruction from the user, to the first printer driver, and the second printer driver executes, in response to the single print instruction from the user, the process based on the third command for causing a printer to print,
wherein the first printer driver does not execute the process based on the first and second commands for causing, in response to the single print instruction from the user, a printer to print.

25. The medium according to claim 24, wherein the first printer driver is a printer driver for a GDI graphics engine and the second printer driver is a printer driver for a graphics engine different from the GDI graphics engine.

26. An information processing system including a first printer driver and a second printer driver, the system comprising:
a processor for executing the following processes in response to a single print instruction from a user;
inputting a first command for logically ANDing a base bitmap and a black-and-white bitmap and a second command for logically ORing a result of the logically ANDing and a bitmap including a black part, wherein the first printer driver is capable of executing a process based on the first and second commands;
generating, from the first and second commands, a third command for rendering on a base bitmap, a bitmap in which the black part included in the bitmap including the black part is transparent and a part other than the black part included in the bitmap including the black part is opaque, wherein the second printer driver is capable of executing a process based on the third command; and
providing the third command so that the third command is provided, in response to the single print instruction from the user, to the second printer driver and is not provided, in response to the single print instruction from the user, to the first printer driver, and the second printer driver executes, in response to the single print instruction from the user, the process based on the third command for causing a printer to print,
wherein the first printer driver does not execute the process based on the first and second commands for causing, in response to the single print instruction from the user, a printer to print.

27. The information processing system according to claim 26, wherein the first printer driver is a printer driver for a GDI graphics engine and the second printer driver is a printer driver for a graphics engine different from the GDI graphics engine.

28. An information processing apparatus including a first printer driver and a second printer driver, the apparatus comprising:
a processor for executing the following processes in response to a single print instruction from a user;
inputting a first command for logically ANDing a base bitmap and a black-and-white bitmap and a second command for logically ORing a result of the logically ANDing and a bitmap including a black part, wherein the first printer driver is capable of executing a PDL generation process based on the first and second commands;
generating, from the first and second commands, a third command for rendering on a base bitmap, a bitmap in which the black part included in the bitmap including the black part is transparent and a part other than the black part included in the bitmap including the black part is opaque, wherein the second printer driver is capable of executing a PDL generation process based on the third command; and
providing the third command so that the second printer driver executes, in response to the single print instruction from the user, a PDL generation process based on the third command for causing a printer to print,
wherein the first printer driver does not execute a PDL generation process based on the third command for causing, in response to the single print instruction from the user, the printer to print.

29. The information processing apparatus according to claim 28, wherein the first printer driver does not execute a PDL generation process based on the first and second commands for causing, in response to the single print instruction from the user, the printer to print.

30. An information processing apparatus comprising:
a processor for executing the following processes in response to a single print instruction from a user;
inputting commands, each relating to a logical operation, wherein a first printer driver for a GDI graphics engine is capable of executing a PDL generation process based on the commands;
generating, from the commands, another command for rendering of an image including a degree of transparency, wherein a second printer driver for another graphics engine different from the GDI graphics engine is capable of executing a PDL generation process based on the another command; and
providing the another command, so that the another command is provided to the second printer driver for the second printer driver to execute a PDL generation process based on the another command for causing, in response to the single print instruction, a printer to print,
wherein the another command is not provided to the first printer driver, and the first printer driver does not execute a PDL generation process based on the another command for causing, in response to the single print instruction, a printer to print.

31. The information processing apparatus according to claim 30, wherein none of the inputted commands is a command for rendering of an image including degree of transparency.

32. The information processing apparatus according to claim 31, wherein the another command is not a command relating to a logical operation.

33. The information processing apparatus according to claim 30, wherein the another graphics engine is a next generation graphics engine of the GDI graphics engine.

34. The information processing apparatus according to claim 30, wherein the first printer driver and the second printer driver are able to cause a same printer to print.

35. The information processing apparatus according to claim 30,
wherein the image including the degree of transparency is a bitmap including an alpha channel, and
wherein the generating of the another command includes generating of the bitmap including an alpha channel from the inputted commands.

36. The information processing apparatus according to claim 30,
wherein the inputted commands correspond to multiple steps of rendering, each of the multiple steps of rendering being executed by a logical operation related to the inputted commands, and
wherein the another command corresponds to a single step of rendering different from any one of the multiple steps, the single step of rendering not being executed by a logical operation.

37. The information processing apparatus according to claim 36,
wherein the image including the degree of transparency is a bitmap including an alpha channel, and
wherein the single step of rendering is executed by alpha blending of the bitmap including an alpha channel.

38. An information processing method for an information processing apparatus, the method comprising:
receiving a single print instruction from a user;

inputting commands, each relating to a logical operation, wherein a first printer driver for a GDI graphics engine is capable of executing a PDL generation process based on the commands;

generating, from the commands, another command for rendering of an image including a degree of transparency, wherein a second printer driver for another graphics engine different from the GDI graphics engine is capable of executing a PDL generation process based on the another command; and providing the another command, so that the another command is provided to the second printer driver for the second printer driver to execute a PDL generation process based on the another command for causing, in response to the single print instruction, a printer to print, wherein the another command is not provided to the first printer driver, and the first printer driver not to execute a PDL generation process based on the another command for causing, in response to the single print instruction, a printer to print.

39. A non-transitory computer readable storage medium storing a program which causes a processor to execute an information processing apparatus, the method comprising:

receiving a single print instruction from a user;

inputting commands, each relating to a logical operation, wherein a first printer driver for a GDI graphics engine is capable of executing a PDL generation process based on the commands;

generating, from the commands, another command for rendering of an image including a degree of transparency, wherein a second printer driver for another graphics engine different from the GDI graphics engine is capable of executing a PDL generation process based on the another command; and providing the another command, so that the another command is provided to the second printer driver for the second printer driver to execute a PDL generation process based on the another command for causing, in response to the single print instruction, a printer to print, wherein the another command is not provided to the first printer driver, and the first printer driver not to execute a PDL generation process based on the another command for causing, in response to the single print instruction, a printer to print.

40. An information processing system comprising:

a processor for executing the following processes in response to a single print instruction from a user;

inputting commands, each relating to a logical operation, wherein a first printer driver for a GDI graphics engine is capable of executing a PDL generation process based on the commands;

generating, from the commands, another command for rendering of an image including a degree of transparency, wherein a second printer driver for another graphics engine different from the GDI graphics engine is capable of executing a PDL generation process based on the another command; and providing the another command, so that the another command is provided to the second printer driver for the second printer driver to execute a PDL generation process based on the another command for causing, in response to the single print instruction, a printer to print, wherein the another command is not provided to the first printer driver, and the first printer driver not to execute a PDL generation process based on the another command for causing, in response to the single print instruction, a printer to print.

41. An information processing apparatus comprising:

a printer driver configured to obtain a command for rendering of an image, the image including a degree of transparency, to execute a PDL generation process based on the command, in response to a single print instruction from a user, wherein the printer driver is a printer driver for a graphics engine different from a GDI graphics engine, and wherein the command is generated, in response to the single print instruction, from input commands, each relating to a logical operation, and is provided so that the generated command is provided to the printer driver for the printer driver to execute a PDL generation process based on the generated command for causing, in response to the single print instruction, a printer to print and is not provided to another printer driver for the GDI graphics engine.

42. The information processing apparatus according to claim 41, wherein the printer driver and the another printer driver are able to cause a same printer to print.

* * * * *